United States Patent Office 3,003,431
Patented Oct. 10, 1961

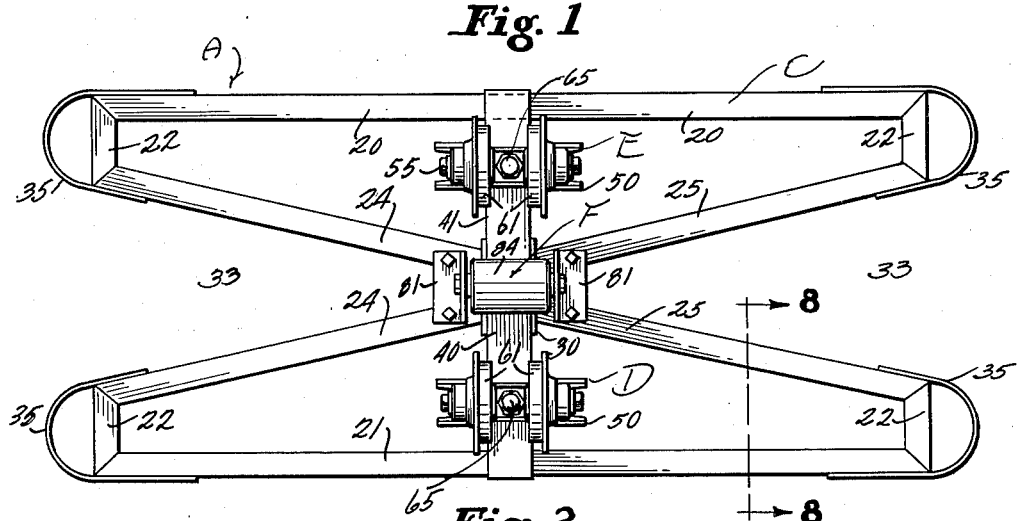
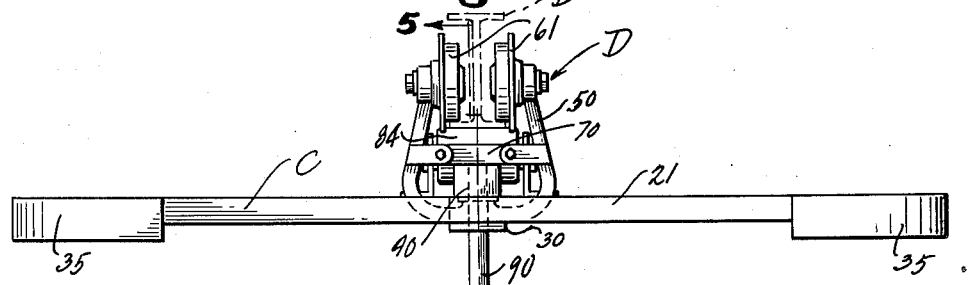
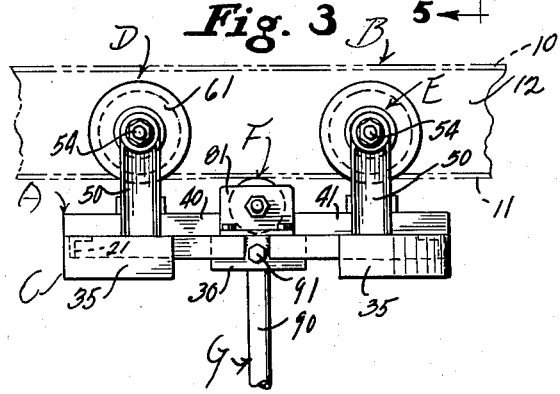
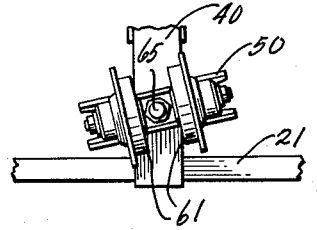
INVENTORS
James M. Markley
Claude D. Parham

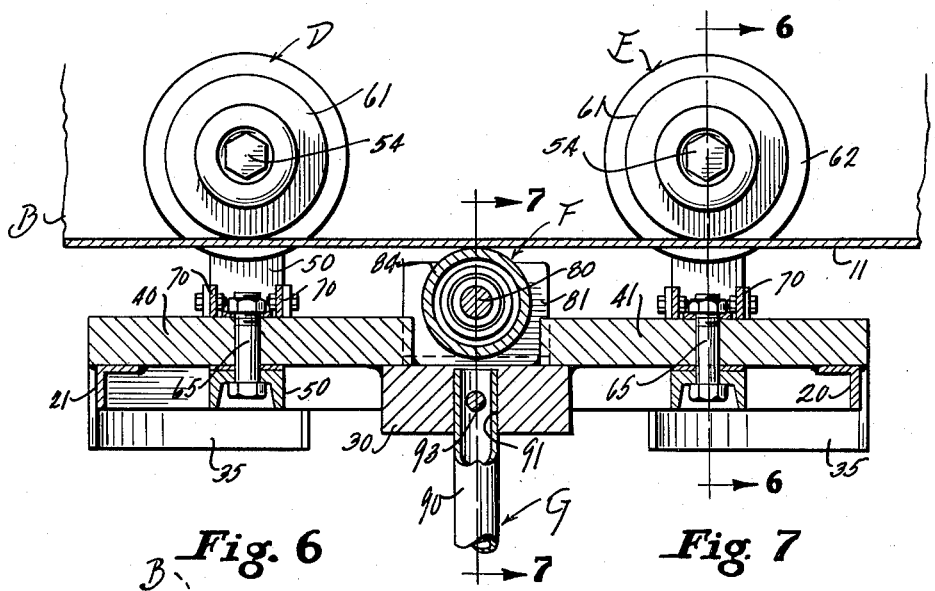
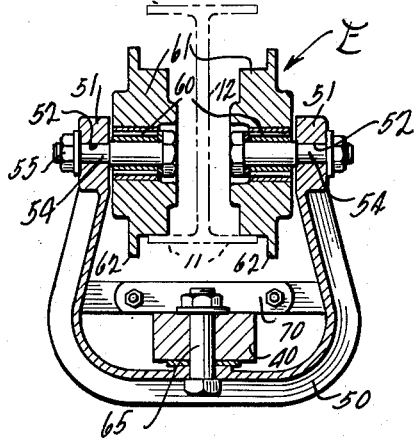
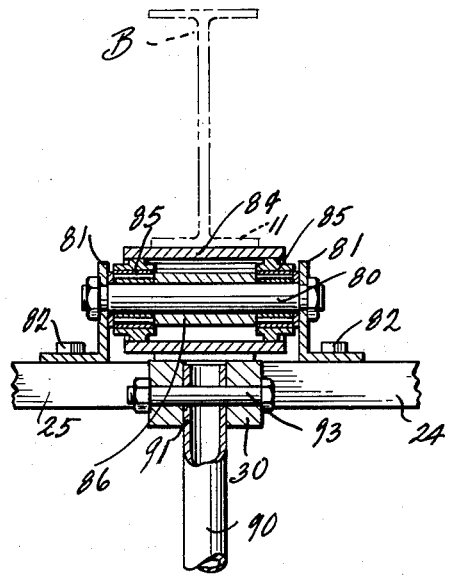
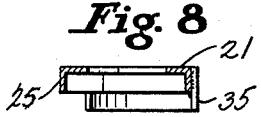

---

3,003,431
TROLLEY ASSEMBLY FOR OVERHEAD RAIL SYSTEMS
James M. Markley, Miami, and Claude D. Parham, Hialeah, Fla., assignors to Eastern Air Lines, Inc., New York, N.Y., a corporation of Delaware
Filed Mar. 24, 1958, Ser. No. 723,488
3 Claims. (Cl. 105—148)

This invention relates to a trolley assembly adapted for riding upon overhead rail systems, such as a monorail system, and adapted to support and transport loads, for straight line and curved travel thereon.

The primary object of this invention is the provision of a trolley assembly adapted for overhead support upon a monorail for carrying a depending standard or support upon which loads are adapted to be connected or supported; the trolley assembly being of a very durable construction which will enable the riding of a load along the monorail system in a properly stabilized supported position; the improved trolley assembly including a wheel system which grips the monorail so as to permit the turning of the trolley assembly around curves etc., without bending or tilting of a load.

The further object of this invention is the provision of a trolley assembly for supporting adjusting and transporting of loads upon monorails which includes a frame provided with means for bumper contact with other equipment, such as adjacent assemblies, in order to prevent interlocking of loads and other parts supported by the trolley assemblies.

Other objects and advantages of this invention will be apparent during the course of the following detailed description.

In the accompanying drawings, forming a part of this specification, and wherein is shown only a preferred embodiment of the invention:

FIG. 1 is a plan view of the improved trolley assemblage.

FIG. 2 is a view of the trolley assemblage looking in the travel line of the rail upon which it is supported.

FIG. 3 is an end view of the trolley assemblage, looking in a direction at right angles to the view shown in FIG. 2.

FIG. 4 is a view showing the manner in which the supporting wheel structure of the trolley assemblage may pivot to enable the trolley assemblage to ride with stability around curved parts of a monorail.

FIG. 5 is an enlarged cross sectional view taken substantially on the line 5—5 of FIG. 2, through the supporting frame structure, and wheel and stabilizing roller assemblage of the trolley.

FIGS. 6 and 7 are cross sectional views taken substantially on their respective lines 6—6 and 7—7, shown in FIG. 5, of the drawings.

FIG. 8 is a cross sectional view taken substantially on the line 8—8 of FIG. 1.

In the drawings, wherein similar reference characters designate corresponding parts throughout the several views, the letter A may generally designate the entire trolley assemblage, which is adapted to ride upon some such overhead rail system as a monorail B. Trolley assemblage A includes a frame C, having supporting wheel structures D and E mounted thereon, adapted to be supported upon the monorail B, and including a stabilizing roller F. The trolley structure supports a tree or supporting standard G, which may be of any improved nature, for supporting loads of various types. In one application, the standard G is that shown in our copending application Serial No. 723,487, filed March 24, 1958, now Patent No. 2,988,012, dated June 13, 1961, relating to tree equipment provided with shelves and other means for supporting and transporting reciprocatory aircraft engine parts, for cleaning and other processing steps.

The monorail B is of a conventional type, including laterally extending top flanges 10 and oppositely and laterally extending bottom flanges 11, upon which the wheels and roller of the trolley assemblage ride. These flanges are connected with the usual web 12.

Referring to the frame structure C, the same preferably includes a pair of elongated parallel bumper bars 20 and 21, angular in cross section, as will be noted from FIG. 8, and which in length, for the purpose for which this invention is used, approximates 51 and one-half inches. These bars 20 and 21 at the ends thereof are provided with short end reinforcing angles 22, welded thereto. Angle type inclined bars 24 and 25 are welded to the end pieces 22 and extend from each side of the center line of the trolley assemblage in relative convergent relation to a location adjacent the monorail, where the same may be welded or otherwise secured to a wheel and roller carrier frame or chassis block or plate 30; the meeting therewith being shown in FIGS. 5 and 7 of the drawings. It will thus be noted that the bumpers comprise sets at each side of the frame 30 and the bumper lengths of each set are relatively spaced to provide ways or spaces 33 which are endwise unobstructed and into which spaces it is possible to move hoists and other equipment for handling the loads adapted to be supported by the trees or standards of the trolley structure. Curved bumper hoops 35 are welded or otherwise secured at the extreme ends of each of the four meeting points of the bars 20 and 21 with the bumper bar portions 24, having outwardly facing convexed surfaces which engage objects, such as the bumper bars of other trolley structures in order that the trolley structures and the trees associated therewith may move along the monorail without entanglement with each other or with the loads or trays supported thereby. The bumper parts are so dimensioned that they will do the trolley pushing work without permitting contact of the shelves of the trees supported by adjacent trolley assemblages. These shelves and trees form the structure of our co-pending application Serial No. 723,487, filed March 24, 1958. The trolley structures travel in groups, for a specific purpose, such as the cleaning and processing of aircraft engine parts, and thus these bumper bar and hoop structures are very vital to efficient operation and travel of the trolley structures and load supporting trees along the monorail.

Referring to the monorail contacting wheel and roller assemblages at D, E and F, the carrier frame or chassis therefor comprises the plate 30, above mentioned, and two end plates 40 and 41, welded thereto, the latter extending in alignment and located in the same plane, and resting upon and being welded to the bars 20 and 21, as is shown in FIG. 5 of the drawings.

The wheel supporting structures D and E are identical, each of the same including a U-shaped carrier head 50, preferably of channeled cross section, the upper ends of which are thickened at 51 and apertured at 52, for receiving supporting shafts 54. The latter may be bolted at 55 to the carrier head 50. The inner ends of the shafts 54 are of larger diameter than the portions in the opening 52, and are adapted to support anti-friction roller bearings 60 for rotatable support of the rail wheels 61, which are spaced with respect to each other. The wheels 61 have peripheral guide flanges 62. The wheels 61 ride upon the flanges 11 of the monorail B at opposite sides of the web 12; there being some space between the flanges 62 and the edges of the flanges 11 for lateral play. The U-shaped carriage heads or frames 50 embrace the plates or bars 40 and 41, as shown in FIG. 6, and are pivotally connected thereto by spindles 65, which are bolts connected to the bars or plates 40 and 41, as shown in FIG. 6, so as to permit the wheels 61 and frame 50 to pivot on the axis of the spindle 65, as when rounding monorail curves. If desired reinforcing straps 70 may be employed to brace the arm structures of the carriage frame 50, and hold it in place, as shown in the drawings; the same engaging the bars or plates 40 and 41 of the carrier chassis, as shown in FIGS. 5 and 6 of the drawing.

It will be noted from the foregoing that the wheel assemblages D and E ride the monorail at spaced locations at each side of the transverse center of the trolley assemblage.

A stabilizing roller assemblage F is provided. It includes a shaft 80 supported upon angle pieces 81, which may be bolted at 82 or otherwise secured to the bar portions 24 and 25 of the frame structure C above described. The rigid non-flexible roller barrel 84 may be supported by anti-friction roller bearings 85, held in spaced relation by a sleeve 86, as shown in FIG. 7; the roller 84 being spaced equi-distant between the wheel assemblages D and E and adapted to ride against the under surfaces of the flanges 11 of the monorail B. The roller 84 is specifically designed to prevent and reduce side sway of the load supporting tree or standard to an absolute minimum.

The post portion 90 of tree or load supporting standard G may be socketed at 91 in the chassis block 30, and removably fixed therein by a cross pin or bolt 93. The tree structure has been detailed and thoroughly described in our co-pending application Serial No. 723,487, filed March 24, 1958. It is adapted to support hanger arms, baskets, trays, shelves and any other types of load supporting equipment. Generally the standard 90 is about 90 inches in length if specifically used for handling parts of air craft reciprocating engines for the cleaning, magnafluxing, quality control, repairing, and sub assemblage thereof.

It will be apparent from the foregoing that an improved trolley assemblage for supporting loads has been provided, the monorail engaging wheel and roller parts of which will enable a load supporting tree to support a load against swing and vibration, and yet with sufficient sensitivity to permit the trolley assemblage to move around curves and rail bends and to insure that the load supporting trees will be maintained out of interfering range with respect to each other. The roller 84 may have a clearance from the bottom of the monorail, which will be determined by the radius of monorail turns in order to prevent the wheels from locking as the load supporting trees take the turns of the monorail.

The parts of this invention are constructed of steel or other suitable rigid metal and may be bolted or welded into the assemblages as described.

Various changes in the shape, size, and arrangement of the parts may be made to the form of invention herein shown and described, without departing from the spirit of the invention or scope of the claims.

We claim:

1. In a trolley assemblage for supporting and transporting of loads upon overhead rail systems, the combination with a monorail having laterally extending supporting flanges, a main frame, a load supporting standard connected to the main frame between the ends of said frame and depending therefrom, upstanding wheel assemblages swivelly mounted on the frame at the ends thereof and relatively disposed at opposite sides of the standard including carrier frames and wheels rotatably supported upon said flanges of the monorail, a stabilizing wheel rotatably carried by the frame beneath the monorail between the wheel assemblages and engaging the undersurface of the monorail to stabilize the trolley assemblage against lateral sway, and bumper extensions for each of the wheel assemblages connected to said frame and extending laterally at each side thereof for appreciable distances, the bumper extensions of each wheel assemblage at each side of the rail being relatively spaced with respect to each other and with the spaces unobstructed from the outer ends of the bumpers through said spaces to the wheel assemblages to permit the entry through said space of load handling equipment to said supporting standard.

2. A trolley assemblage for riding upon monorails including a frame having monorail engaging wheel means carried thereby and a depending load supporting means also carried thereby adjacent to the wheel means, and a bumper assemblage carried by the frame including front and rear sets of laterally elongated bumper bars each having outer ends, the bars of each set being relatively spaced with respect to each other at each side of the wheel means and with the spaces between said bars of each set being unobstructed from the outer ends of the sets directly to the location of the load supporting means in order to permit entry along said spaces of load lifting hoist means to the central area of the assemblage immediately adjacent to the load supporting means.

3. The trolley and bumper structure of claim 2 in which said bars of each set relatively diverge outwardly from said load supporting means whereby each of said spaces gradually widens from the load supporting means to the outer ends of the bars.

References Cited in the file of this patent

UNITED STATES PATENTS

| | | |
|---|---|---|
| 1,624,205 | Bennington | Apr. 12, 1927 |
| 1,734,175 | McCabe | Nov. 5, 1929 |
| 1,775,429 | Harris | Sept. 9, 1930 |
| 1,833,514 | Bereit | Nov. 24, 1931 |
| 1,968,373 | Carter | July 31, 1934 |
| 2,168,986 | Harris | Aug. 8, 1939 |
| 2,512,034 | Moore | June 20, 1950 |

FOREIGN PATENTS

| | | |
|---|---|---|
| 417,965 | France | Sept. 16, 1910 |